(12) United States Patent
St. Amant et al.

(10) Patent No.: US 8,795,420 B1
(45) Date of Patent: Aug. 5, 2014

(54) APPARATUS FOR REMOVING UNWANTED CONTAMINATES FROM GASES

(75) Inventors: Jefferey St. Amant, League City, TX (US); Kenneth R. Matheson, Corpus Christi, TX (US); Keith Nathan, Seabrook, TX (US)

(73) Assignee: Vapor Point, LLC, La Porte, TX (US)

( * ) Notice: Subject to any disclaimer, the term of this patent is extended or adjusted under 35 U.S.C. 154(b) by 505 days.

(21) Appl. No.: 13/191,787

(22) Filed: Jul. 27, 2011

(51) Int. Cl.
*B01D 53/14* (2006.01)

(52) U.S. Cl.
USPC ............ 96/329; 96/333; 96/342; 96/351; 96/361; 96/365; 96/300; 95/214; 95/226; 95/237; 422/168

(58) Field of Classification Search
CPC ............... B01D 53/14; B01D 53/1487; B01D 53/1456; B01D 53/1486; B01D 53/1481; B01D 53/006; B01D 47/021; B01D 53/34; B01D 53/78; B01D 53/50; B01D 53/52; B01D 53/58; B01D 2257/302; B01D 2257/304; B01D 2257/406
USPC ........... 96/329, 330, 333, 337, 342, 351, 361, 96/363, 364, 365, 300; 95/149, 214, 223, 95/226, 235, 237; 422/168
See application file for complete search history.

(56) References Cited

U.S. PATENT DOCUMENTS

| | | | | |
|---|---|---|---|---|
| 4,253,851 A * | 3/1981 | Brooks et al. | | 95/214 |
| 5,064,450 A * | 11/1991 | Lankton et al. | | 95/235 |
| 5,078,759 A * | 1/1992 | Kira | | 95/223 |
| 5,122,165 A | 6/1992 | Wang et al. | | |
| 5,453,107 A * | 9/1995 | Liu | | 95/226 |
| 6,398,851 B1 * | 6/2002 | Bose | | 95/237 |
| 6,562,106 B2 * | 5/2003 | Campbell | | 96/329 |
| 6,616,733 B1 * | 9/2003 | Pellegrin | | 96/342 |
| 6,893,484 B2 * | 5/2005 | Thomas | | 95/226 |
| 7,147,689 B1 | 12/2006 | Miller | | |
| 2006/0213370 A1 * | 9/2006 | Leonard et al. | | 96/243 |
| 2007/0251393 A1 * | 11/2007 | Pope et al. | | 96/329 |
| 2008/0014350 A1 * | 1/2008 | Carlson et al. | | 427/255.21 |
| 2011/0067994 A1 | 3/2011 | Moorhead et al. | | |
| 2013/0247767 A1 * | 9/2013 | Goldstein | | 96/329 |

* cited by examiner

*Primary Examiner* — Jason M Greene

(74) *Attorney, Agent, or Firm* — Buskop Law Group, PC; Wendy Buskop

(57) ABSTRACT

An apparatus for removing unwanted contaminates from gases, wherein the apparatus can include a housing that has at least one removable portion. The apparatus can also include a reaction chamber formed within the housing. A cartridge can be disposed in the reaction chamber. The cartridge can be connected to the removable portion of the housing.

18 Claims, 4 Drawing Sheets

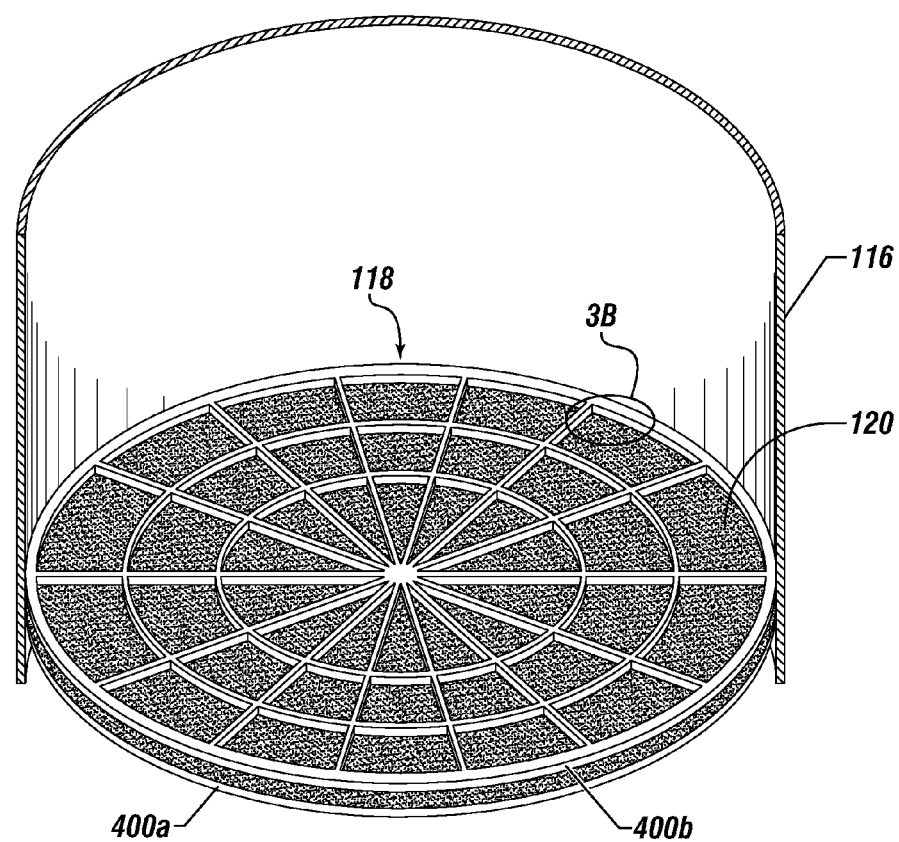
FIGURE 3A
FIGURE 3B
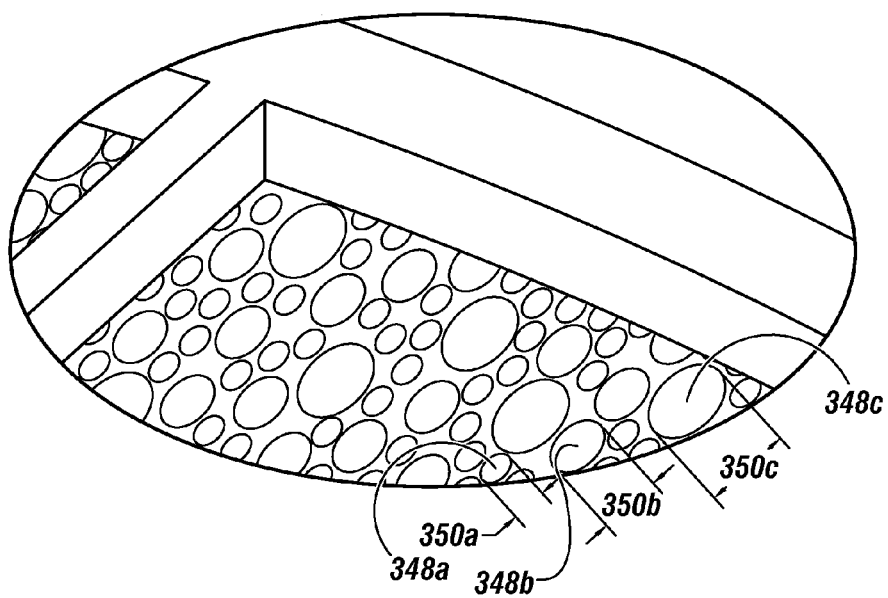

APPARATUS FOR REMOVING UNWANTED CONTAMINATES FROM GASES

FIELD

The present embodiments generally relate to an apparatus for removing unwanted contaminates from gases, wherein the configuration of the apparatus allows for efficient maintenance.

BACKGROUND

A need exists for an apparatus for removing unwanted contaminates from gases with up to about 100 percent efficiency and no less than about 70 percent efficiency.

A further need exists for an apparatus for removing unwanted contaminates from gases that does not require utilities and does not generate heat.

A further need exists for an apparatus for removing unwanted contaminates from gases that is low pressure to operate, which is safer than other scrubbers that operate at high pressures.

A need exists for an apparatus for removing unwanted contaminates from gases that utilizes a cartridge and an unique housing design, allowing for enhanced efficient maintenance.

The present embodiments meet these needs.

BRIEF DESCRIPTION OF THE DRAWINGS

The detailed description will be better understood in conjunction with the accompanying drawings as follows:

FIG. 3A depicts a partial cut view of a cartridge revealing a sintered permeable membrane.

FIG. 3B depicts a detailed view of a portion of the sintered permeable membrane in FIG. 3A.

Figure 1:
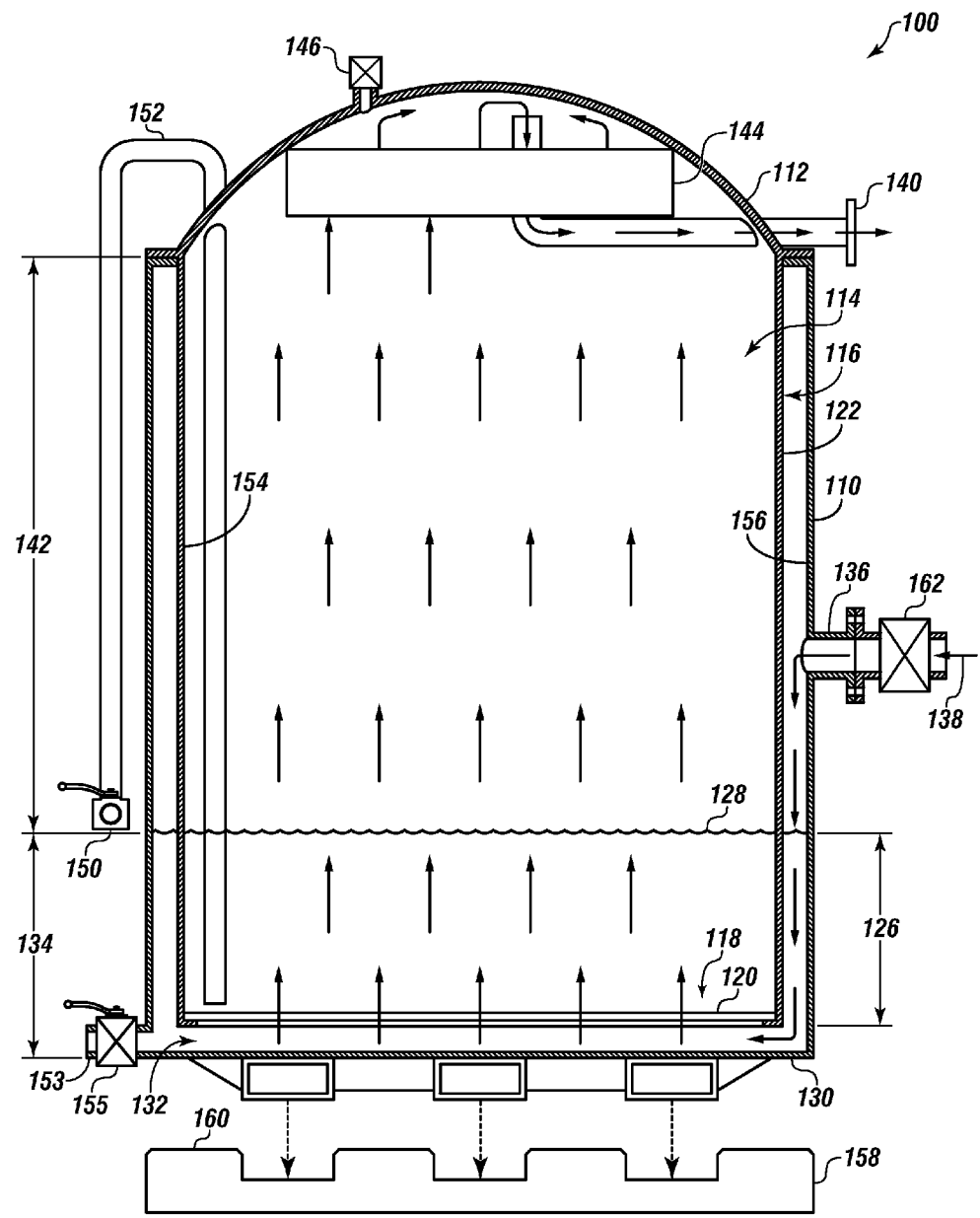
FIG. 1 is schematic view of an apparatus according to one or more embodiments.

The present embodiments are detailed below with reference to the listed Figures.

DETAILED DESCRIPTION OF THE EMBODIMENTS

Before explaining the present apparatuses and systems in detail, it is to be understood that the apparatuses and systems are not limited to the particular embodiments and that they can be practiced or carried out in various ways.

The apparatus for removing unwanted contaminates from gases can include a housing. A portion of the housing can be configured to be removed from the housing. For example, a top portion, a wall, a portion of a wall, a bottom portion, or combinations thereof can be configured to be removed from the other portions of the housing.

A cartridge can be connected to the portion of the housing that is configured to be removed from other portions of the housing. This unique assembly can allow for efficient maintenance and provide safety to maintenance personnel. In addition, the unique configuration can reduce the time and cost associated with the service of the apparatus.

The cartridge can be disposed within a reaction chamber formed within the housing. The cartridge can include a gas transmitting floor connected to a non-gas transmitting portion. In one or more embodiments, the non-gas transmitting portion can be connected indirectly or directly with the portion of the housing configured to be removed from other portions of the housing. A space can be formed between a first portion of the housing and the gas transmitting floor. The cartridge can have a cylindrical, square, rectangular, or other shape.

The gas transmitting floor can include a sintered permeable membrane. The sintered permeable membrane can have pores with different pore sizes. The sintered permeable membrane can include a plurality of pores, wherein the plurality of pores can have varying pore sizes. For example, the sintered permeable membrane can have a pore size from about 10 microns to about 10,000 microns. In one or more embodiments, the sintered permeable membrane can have void spaces. The void spaces can have a total area from about 40 percent to about 50 percent of the area of the sintered permeable membrane. The sintered permeable membrane can be from about $\frac{1}{32}$ of an inch thick to about 24 inches thick.

In one or more embodiments, the sintered permeable membrane can include ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations thereof.

A portion of the reaction chamber, a first cartridge portion of the cartridge, and the spaces can have a lean liquid located therein. The lean liquid can include a liquid adsorbent, a liquid solubilizer, a liquid absorbent, a liquid reacting agent, water, surfactants, a biomass, biodiesel, or combinations thereof.

A reaction zone can be formed in the reaction chamber, the space, and in the first cartridge portion below a liquid level of the lean liquid.

The housing can have an inlet formed therethrough. The inlet can be in fluid communication with the space formed between the gas transmitting floor and the first portion of the housing, and the inlet can be configured to provided pressurized contaminated gas to the space. Accordingly, the lean liquid can be adjacent to or can cover the first side and the second side of the sintered permeable membrane. This configuration allows for the lean liquid to contact the contaminated gas prior to the contaminated gas passing through the sintered permeable membrane and after the contaminated gas passes through the sintered permeable membrane.

Accordingly, the scrubbing of the contaminated gas, i.e., the removal of one or more contaminates in the gas, can have enhanced efficacy. Illustrative contaminates can include volatile organic compounds, hazardous air pollutants, hydrogen sulfides, ammonia, sulfur dioxide and combinations thereof. The contaminated gas can be gases that exceed federal Environmental Protection Agency "EPA", Title 40 regulations as of Jan. 1, 2009 and Texas Commission on Environmental Quality Title 30 regulations regulatory levels as of Jan. 1, 2009.

An inlet check valve can be directly or indirectly connected with the inlet. The inlet check valve can be configured to control the flow rate of contaminated gas into the tank, prevent back flow from the interior of the housing, or combinations thereof.

The apparatus can also include a gas exit port in fluid communication with a second cartridge portion and an interior portion of the housing. The gas exit port can evacuate scrubbed gases that have passed through the sintered permeable membrane and lean liquid from the interior of the housing.

A demister pad can be connected with the gas exit port. For example, the demister pad can be connected to an inlet end of the gas exit port. The demister pad can remove excess moisture in the scrubbed gas before the scrubbed gas is evacuated from the interior of the tank.

A pressure relief valve can be operatively connected with the housing. The pressure relief valve can be configured to allow the release of pressure within the housing when a predetermined pressure is achieved within the housing.

One or more drain ports can be formed through the housing and can be in fluid communication with the reaction zone. The drain port can have a drain valve connected therewith. The drain valve can be configured to control the flow rate of fluid out of the drain port. The drain valve can be directly or indirectly connected to the drain port. For example, the drain valve can be located between a conduit and the drain port, integrated into a conduit connected to the drain port, or in any other way that allows the drain valve to control the flow rate of fluid through the drain port.

In one or more embodiments, a liner can be disposed on an inner surface of the cartridge. The liner can be a film, a thermoplastic or composite coating, a phenolic resin coating, an epoxy paint, a rubber or combinations thereof. The liner can have any thickness. For example, the liner can have a thickness from about 5 mills to about 40 mills.

In one or more embodiments, a housing liner can be disposed on at least a portion of an inner portion of the housing. The housing liner can be film, a thermoplastic or composite coating, a phenolic resin coating, an epoxy paint, a rubber or combinations thereof. The housing liner can have any thickness. For example, the housing liner can have a thickness from about 5 mills to about 40 mills.

A base can be operatively connected with the bottom of the housing. The base can include a plurality of support members connected with the housing. The support members can be configured to have voids therebetween, providing a lifting point. For example, the voids can be configured to operatively receive forks on a fork lift.

In one or more embodiments, a knock out canister, such as those custom made by Proco of Kingsville, Tex., can serve to knock out, remove, or capture any liquid entrained in the scrubbed gas. The knock out canister can be connected with or adjacent to the gas exit port.

One or more apparatuses can be integrated into a system for removing unwanted contaminates from gases. The system can include a plurality of apparatuses. The apparatuses can be connected in series, in parallel, or combinations thereof with a contaminated gas source.

In one or more embodiments, one or more apparatuses can be disposed on a bed of a truck. A vacuum pump can also be on the truck. The vacuum pump can have a vacuum pump exhaust. The apparatuses, for example, at the gas exit port, can be in fluid communication with the vacuum pump exhaust.

The apparatuses can be removably connected to the truck bed, creating a modular transportable system using modular apparatuses, or the apparatuses can be welded to the truck, creating an immovable apparatus on the bed, while the truck is movable.

Turning now to the Figures, FIG. 1 is schematic view of an apparatus according to one or more embodiments. The apparatus for removing unwanted contaminates from gases 100 can include a housing 110. The housing 110 can include at least one removable portion 112.

A reaction chamber 114 can be formed within the housing 110. A cartridge 116 can be disposed in the reaction chamber 114.

The cartridge can include a gas transmitting floor 118. The gas transmitting floor 118 can include a sintered permeable membrane 120. The sintered permeable membrane 120 is described in more detail below in FIGS. 3A and 3B below.

One or more non-gas transmitting portions, such as non-gas transmitting portion 122, can be connected with the gas transmitting floor 118. The non-gas transmitting portion 122 can be connected to the removable portion 112. A space 132 can be formed between a first portion of the housing 130 and the gas transmitting floor 118.

At least a portion of a first cartridge portion 126, the reaction chamber 114, and the space 132 can contain a lean liquid 128. At least a portion of the lean liquid 128 located within the space 132, the reaction chamber 114, and the first cartridge portion 126 can form a reaction zone 134.

An inlet 136 can be formed through the housing 110. The inlet 136 can be in fluid communication with the space 132. The inlet 136 can provide pressurized contaminated gas 138 to the space 132.

A gas exit port 140 can be in fluid communication with a second cartridge portion 142 and at least a portion of the reaction chamber 114. The gas exit port 140 can be connected with a demister pad 144.

A pressure relief valve 146 can be disposed in the housing 110. The pressure relief valve 146 can be any pressure relief valve and can be configured to release pressure from within the housing 110 if a predetermined pressure is reached within the housing 110. In one or more embodiments, the pressure relief valve 146 can be located on a exit port conduit.

A drain valve 150 can be connected with a drain port 152 formed through the housing 110. The drain valve 150 can control the flow rate of fluid through the drain port 152.

A liner 154 can be disposed on an inner surface of the cartridge 116. A housing liner 156 can be disposed on at least a portion of an inner portion of the housing 110.

A base 158 can be operatively connected with the housing 110, such as to the bottom of the housing 110. The base 158 can include a plurality of support members 160. The plurality of support members 160 can be connected with the housing 110.

An inlet check valve 162 can be connected with the inlet 136. The inlet check valve 162 can be configured to prevent back flow from the interior of the housing 110. The inlet check valve 162 can be a swinging check valve, a ball check valve, or another check valve.

An additional drain port 153 can be in fluid communication with the space 132. A drain port valve 155 can control flow of fluid through the drain port 153.

Figure 2:
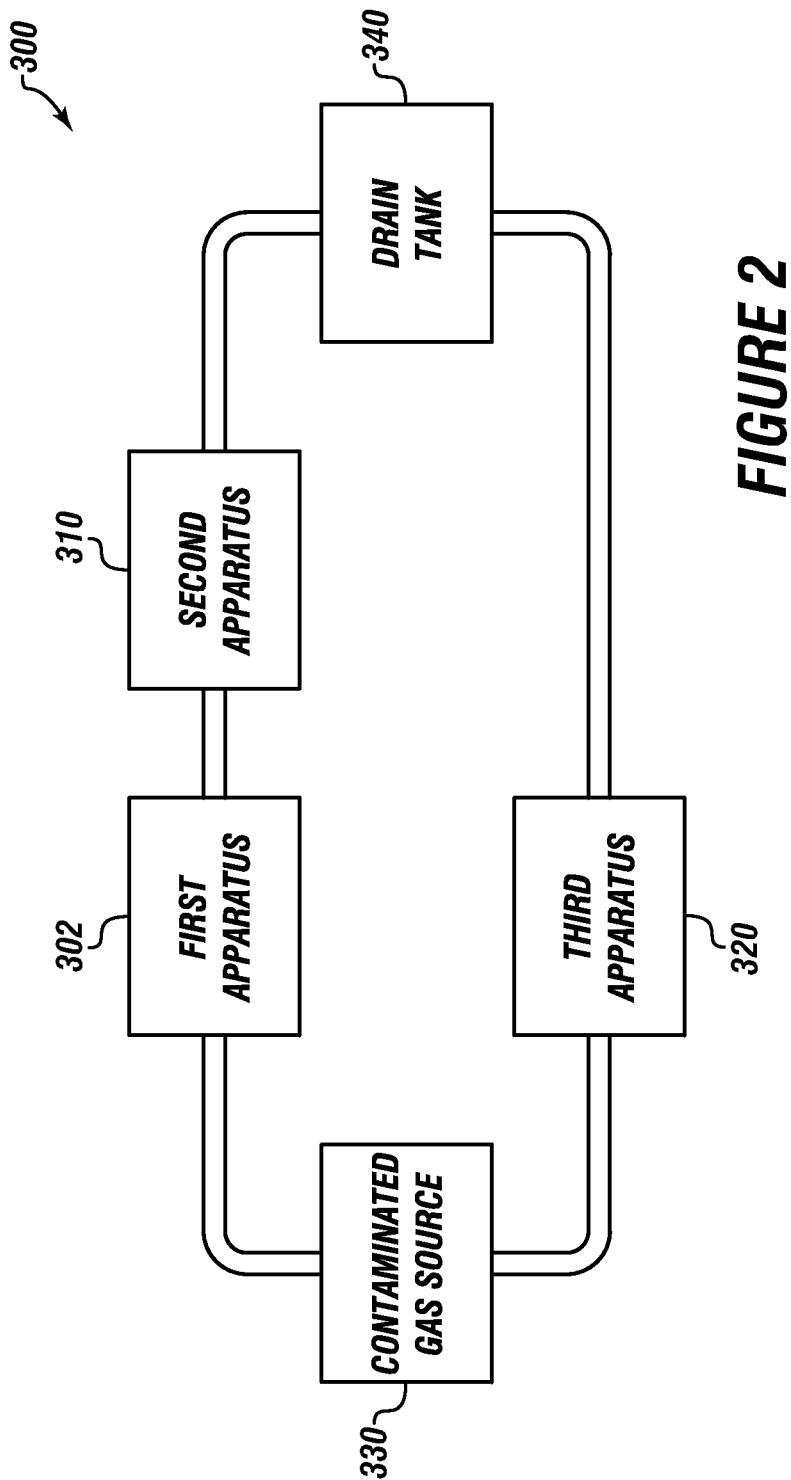
FIG. 2 depicts a plurality of apparatuses integrated into a system according to one or more embodiments.

FIG. 2 depicts a plurality of apparatuses integrated into a system according to one or more embodiments.

The system for removing unwanted contaminates from gases 300 can include a first apparatus 302 connected to a contaminated gas source 330. The first apparatus 302 can be connected in series to a second apparatus 310.

A third apparatus 320 can be connected to the contaminated gas source 330 and in parallel to the apparatuses 302 and 310. The apparatuses 302, 310, and 320 can be substantially similar to the apparatuses described herein.

A drain tank 340 can be in fluid communication with the apparatuses 302, 310, and 320.

FIG. 3A depicts a partial cut view of a cartridge revealing a sintered permeable membrane. FIG. 3B depicts a detailed view of a portion of the sintered permeable membrane in FIG. 3A.

Referring to FIGS. 3A and 3B, the cartridge 116 can have sintered permeable membrane 120 can be connected to the gas transmitting floor 118. The sintered permeable membrane 120 can be held in place by plates 400a and 400b. The sintered permeable membrane can have pores 348a, 348b, and 348c. The pores 348a, 348b, and 348c can have diameters 350a, 350b, and 350c. The diameters 350a, 350b, and 350c can range from about 1 micron to about 10,000 microns.

The sintered material of the sintered permeable membrane 120 can have void spaces equivalent to about 40 percent to about 50 percent of the sintered permeable membrane that is the material making up the membrane can have open spaces that are from about 40 percent to about 50 percent. The sintered material of the sintered permeable membrane can have both internal pores and external pores.

In an embodiment, the void spaces can be greater than 50 percent or less than 40 percent depending upon the sintered material used. For example, if the sintered material used is carbon aerogel, it can have a void fraction of about >680 percent.

The sintered permeable membrane 120 can be from about 1/32 of an inch thick to about 24 inches thick The sintered permeable membrane can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

Figure 4:
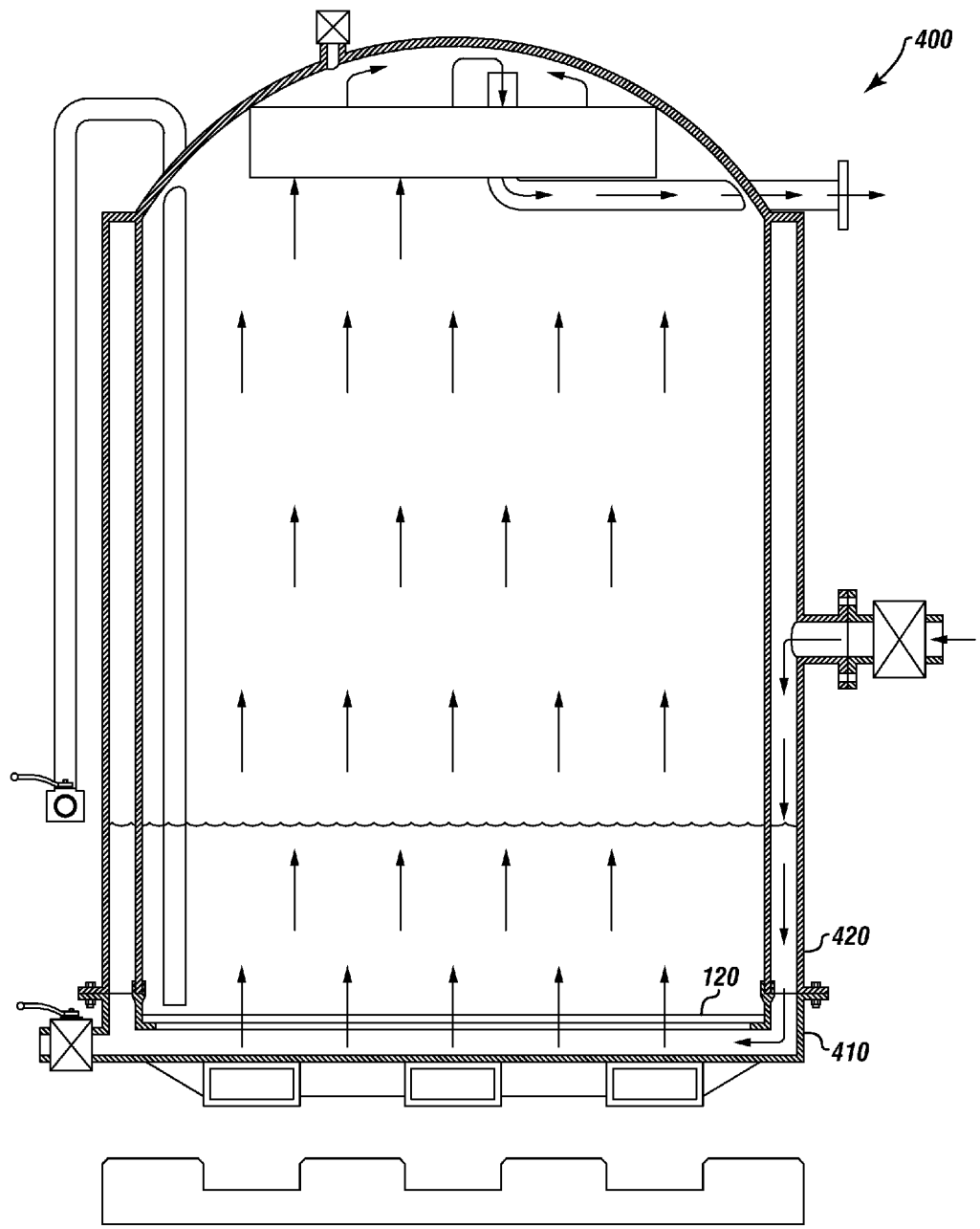
FIG. 4 depicts another embodiment of the apparatus.

FIG. 4 depicts another embodiment of an apparatus. Certain portions of the apparatus 400 that have been described above have not been called out for clarity purposes. The apparatus 400 can include a upper housing portion 420 that is selectively attachable with a lower housing portion 410. The lower housing portion 410 can have the sintered permeable membrane 120 connected therewith. The apparatus 400 can be configured to exhaust scrubbed gases and receive contaminated gases.

While these embodiments have been described with emphasis on the embodiments, it should be understood that within the scope of the appended claims, the embodiments might be practiced other than as specifically described herein.

What is claimed is:

1. An apparatus for removing unwanted contaminates from gases, wherein the apparatus comprises:
    a. a housing comprising at least one removable portion;
    b. a reaction chamber formed within the housing;
    c. a cartridge disposed in the reaction chamber, wherein the cartridge is connected to the removable portion of the housing, wherein the cartridge comprises:
        (i) a gas transmitting floor comprising a sintered permeable membrane, wherein the sintered permeable membrane has a first side and a second side, and wherein the sintered permeable membrane is disposed across the reaction chamber; and
        (ii) a non-gas transmitting portion connected with the gas transmitting floor, wherein a space is formed between a first portion of the housing, wherein at least a portion of the reaction chamber, the cartridge, and the space contains a lean liquid, and wherein at least a portion of the lean liquid in the reaction chamber, the first cartridge portion, and the space form a reaction zone, and wherein the lean liquid is adjacent to or covers the first side and the second side of the sintered permeable membrane;
    d. an inlet in fluid communication with the space, wherein the inlet is configured to provide pressurized contaminated gas to the space;
    e. a gas exit port in fluid communication with a second cartridge portion and the reaction chamber; and
    f. a demister pad connected with the gas exit port.

2. The apparatus of claim 1, wherein the sintered permeable membrane comprises pores with different pore sizes.

3. The apparatus of claim 1, further comprising a pressure relief valve operatively disposed on the housing.

4. The apparatus of claim 1, wherein the sintered permeable membrane comprises a plurality of pores, wherein the plurality of pores have varying pore sizes.

5. The apparatus of claim 1, wherein the sintered permeable membrane has a pore size from 10 microns to 10,000 microns.

6. The apparatus of claim 1, wherein the sintered permeable membrane is from 1/32 of an inch thick to 24 inches thick.

7. The apparatus of claim 1, wherein the sintered permeable membrane comprises a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations thereof.

8. The apparatus of claim 1, wherein the housing further comprises a drain port in fluid communication with the reaction zone.

9. The apparatus of claim 8, further comprising a drain valve connected with the drain port, and wherein the drain valve is configured to control a flow rate through the drain port.

10. The apparatus of claim 1, wherein the lean liquid comprises a liquid adsorbent, a liquid solubilizer, a liquid absorbent, a liquid reacting agent, water, surfactants, a biomass, biodiesel, or combinations thereof.

11. The apparatus of claim 1, wherein the contaminates comprise volatile organic compounds, hazardous air pollutants, hydrogen sulfides, ammonia, sulfur dioxide and combinations thereof.

12. The apparatus of claim 1, further comprising a liner disposed on at least a portion of an inner surface of the cartridge.

13. The apparatus of claim 1, further comprising a housing liner disposed on at least a portion of an inner portion of the housing.

14. The apparatus of claim 1, further comprising a base operatively connected with the housing.

15. The apparatus of claim 14, wherein the base comprises a plurality of support members connected with the housing.

16. The apparatus of claim 1, further comprising an inlet check valve connected with the inlet, wherein the inlet check valve is configured to prevent back flow from the reaction chamber.

17. A system for removing unwanted contaminates from gases comprising a plurality of apparatuses for removing unwanted contaminates from gases, wherein the apparatuses are connected in series, in parallel, or combinations thereof with a contaminated gas source, and wherein each apparatus of the plurality of apparatuses comprises:
    a. a housing comprising at least one removable portion;
    b. a reaction chamber formed within the housing;
    c. a cartridge disposed in the reaction chamber, wherein the cartridge is connected to the removable portion of the housing, wherein the cartridge comprises:
        (i) a gas transmitting floor comprising a sintered permeable membrane; and
        (ii) a non-gas transmitting portion connected with the gas transmitting floor, wherein a space is formed between a first portion of the housing, wherein at least a portion of the reaction chamber, the cartridge, and the space contains a lean liquid, and wherein at least a portion of the lean liquid in the reaction chamber, the first cartridge portion, and the space form a reaction zone;

d. an inlet in fluid communication with the space formed between the gas transmitting floor and the first portion of the housing, wherein the inlet is configured to provide pressurized contaminated gas to the space;

e. a gas exit port in fluid communication with a second cartridge portion and an the reaction chamber; and f. a demister pad connected with the gas exit port.

18. An apparatus for removing unwanted contaminates from gases, wherein the apparatus comprises: a housing, wherein the housing is configured to exhaust scrubbed gases and receive contaminated gases, wherein the housing comprises a removable portion, wherein the removable portion is connected with a sintered permeable membrane; wherein a lean liquid is adjacent to or covers a first side and a second side of the sintered permeable membrane.

\* \* \* \* \*